(12) United States Patent
Yamada et al.

(10) Patent No.: US 9,223,309 B2
(45) Date of Patent: Dec. 29, 2015

(54) PLANT MONITORING AND CONTROL SYSTEM AND PLANT MONITORING AND CONTROL METHOD

(71) Applicant: HITACHI, LTD., Tokyo (JP)

(72) Inventors: Takahiro Yamada, Mito (JP); Yoshio Maruyama, Mito (JP); Tohru Akatsu, Hitachi (JP)

(73) Assignee: Hitachi, Ltd., Tokyo (JP)

( * ) Notice: Subject to any disclaimer, the term of this patent is extended or adjusted under 35 U.S.C. 154(b) by 352 days.

(21) Appl. No.: 13/754,144

(22) Filed: Jan. 30, 2013

(65) Prior Publication Data
US 2013/0200990 A1      Aug. 8, 2013

(30) Foreign Application Priority Data
Feb. 3, 2012    (JP) .................................. 2012-021958

(51) Int. Cl.
G05B 23/02        (2006.01)
G05B 9/03         (2006.01)

(52) U.S. Cl.
CPC .............. *G05B 23/0259* (2013.01); *G05B 9/03* (2013.01); *G05B 23/0213* (2013.01); *G05B 23/0286* (2013.01); *G05B 2219/13* (2013.01); *G05B 2219/24175* (2013.01); *G05B 2219/24182* (2013.01)

(58) Field of Classification Search
CPC .. G05B 23/0259; G05B 23/0213; G05B 9/03; G05B 2219/24182; G05B 2219/24175
USPC .................................. 340/3.44; 714/4; 700/21
See application file for complete search history.

(56) References Cited

U.S. PATENT DOCUMENTS 4,975,238 A  *  12/1990  Regan et al. .................. 376/216
6,924,727 B2 *   8/2005  Nagaoka et al. ............... 340/3.1

(Continued)

FOREIGN PATENT DOCUMENTS

| CN | 1527169 A | 9/2004 |
|---|---|---|
| JP | 10-283015 A | 10/1998 |
| WO | 2011/026734 A1 | 3/2011 |

OTHER PUBLICATIONS

European Search Report received in European Application No. 13153347 dated Feb. 10, 2014.

(Continued)

*Primary Examiner* — Jennifer Mehmood
*Assistant Examiner* — Omar Casillashernandez
(74) *Attorney, Agent, or Firm* — Mattingly & Malur, PC (57) ABSTRACT

A monitoring apparatus has: an abnormality detecting unit which can detect an abnormality of a self apparatus; a second communication unit for receiving state information through a second communication network; a plant information forming unit for forming plant information as information regarding the whole plant equipment based on a plurality of state information; a first communication unit for transmitting the plant information to a maintenance tool through a first communication network; and an abnormal-case control unit constructed in such a manner that when the abnormality detecting unit detects the abnormality, a substituting request is transmitted to the other control unit, when a response to the substituting request is affirmative, an operation of the self apparatus is stopped, and when the response to the substituting request is negative or when the response to the substituting request is not received, the state information is transferred to the maintenance tool.

5 Claims, 8 Drawing Sheets

(56) References Cited

U.S. PATENT DOCUMENTS

| | | |
|---|---|---|
| 2001/0056304 A1 | 12/2001 | Nitta |
| 2002/0038200 A1* | 3/2002 | Shimizu et al. ............... 702/188 |
| 2004/0153700 A1* | 8/2004 | Nixon et al. ...................... 714/4 |
| 2007/0176732 A1* | 8/2007 | Humpert et al. ............. 340/3.44 |

OTHER PUBLICATIONS

Chinese Office Action received in corresponding Chinese Application No. 201310038796.5 dated Nov. 14, 2014.

* cited by examiner

PLANT MONITORING AND CONTROL SYSTEM AND PLANT MONITORING AND CONTROL METHOD

BACKGROUND OF THE INVENTION

The invention relates to a plant monitoring and control system and a plant monitoring and control method for monitoring and controlling a plant.

Each equipment (for example, boiler, turbine, power generator, furnace, tank, reactor, heat exchanger, etc.) of a plant is controlled by a unit for controlling each equipment (hereinbelow, referred to as "equipment control unit"). The equipment control unit has, for example, a PCM (Programmable Control Module) and the like.

A plant monitoring and control unit can obtain a state of the equipment (that is, the boiler, turbine, or the like mentioned above) which is controlled by each equipment control unit from each equipment control unit through a communication network. The plant monitoring and control unit can collectively present the states obtained from the respective equipment control units to an administrator of the plant.

JP-A-10-283015 discloses such a technique that in the case where an abnormality within a range where it can be predicted occurred in a part of functional elements of a plant monitoring apparatus 3, a part of a plant monitoring function is automatically shifted to an operating state of the previously-programmed contents in accordance with a state of the abnormality.

SUMMARY OF THE INVENTION

Ordinarily, the plant monitoring and control unit has been multiplexed. This is because it is necessary to raise a reliability and a trouble resistance. If some trouble occurred in a main plant monitoring and control unit, the main plant monitoring and control unit is stopped and a sub plant monitoring and control unit stands in for it.

However, there is a fear that some trouble also occurs in the sub plant monitoring and control unit. In such a case, the plant administrator cannot grasp the state of each equipment of the plant at all.

It is an object of the invention to provide a plant monitoring and control system and a plant monitoring and control method which can raise the reliability and the trouble resistance.

It is another object of the invention to provide a plant monitoring and control system and a plant monitoring and control method in which even if a trouble occurred in a plant monitoring and control unit, a plant administrator can monitor a state of plant equipment as much as possible.

According to an embodiment of the invention, there is provided a plant monitoring and control system comprising: a plurality of monitoring apparatuses for monitoring states of a plurality of plant equipment through a second communication network; and a maintenance tool for controlling the plurality of monitoring apparatuses through a first communication network. Each monitoring apparatus comprises: an abnormality detecting unit for detecting an abnormality of a self apparatus; a second communication unit for receiving state information serving as information regarding the states of the plurality of plant equipment from the plurality of plant equipment through a second communication network; a plant information forming unit for forming plant information serving as information regarding the whole plant equipment on the basis of the plurality of state information; a first communication unit for transmitting the plant information to the maintenance tool through the first communication network; and an abnormal-case control unit which is constructed in such a manner that when the abnormality detecting unit detects the abnormality, a substituting request for requesting a substitution of a process of the self apparatus is transmitted to the other monitoring apparatus among the plurality of monitoring apparatuses, when a response to the substituting request is affirmative, the operation of the self apparatus is stopped, and when the response to the substituting request is negative or when the response to the substituting request is not received, the first communication unit and the second communication unit are controlled and the state information received by the first communication unit is transferred to the maintenance tool.

According to a preferred embodiment, when the substituting request is transmitted to the other monitoring apparatus, the abnormal-case control unit may instruct both of the first communication unit and the second communication unit so as to transmit the substituting request to the other monitoring apparatus.

Other objects, features, and advantages of the present invention will become apparent from the following description of embodiments of the present invention provided in relation to the accompanying drawings.

BRIEF DESCRIPTION OF THE DRAWINGS

FIG. 6 is a flowchart showing a process of the main monitoring apparatus 3a;

DESCRIPTION OF THE EMBODIMENT

In an embodiment, as will be described hereinbelow, in the case where an abnormality occurred in one of monitoring apparatuses, even if the other monitoring apparatus which can become a substitution of one of the monitoring apparatuses does not exist, a state of plant equipment is transferred to an administrator as much as possible.

Figure 1:
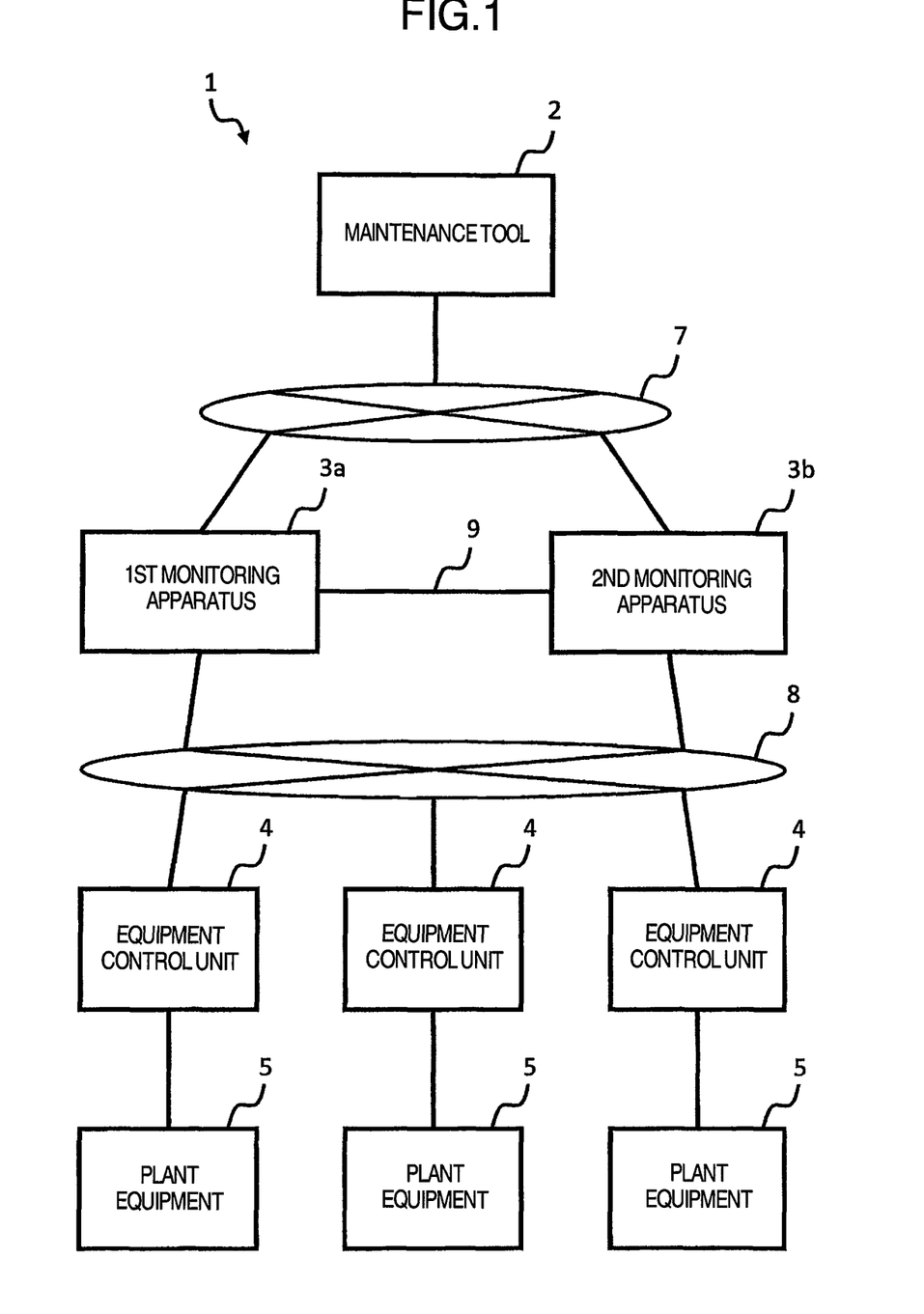
FIG. 1 is a schematic diagram showing a whole plant monitoring and control system 1 according to an embodiment of the invention.

FIG. 1 is a schematic diagram showing a whole plant monitoring and control system 1 according to an embodiment of the invention. The plant monitoring and control system 1 has, for example, a maintenance tool 2, a first monitoring apparatus 3a, a second monitoring apparatus 3b, a plurality of equipment control units 4, and a plurality of plant equipment 5. The maintenance tool 2 is connected to the first monitoring apparatus 3a and the second monitoring apparatus 3b through a first communication network 7. The first monitoring apparatus 3a and the second monitoring apparatus 3b are connected to the equipment control units 4 through a second communication network 8. There is a case where the first monitoring apparatus 3a and the second monitoring apparatus 3b are collectively referred to as a monitoring apparatus 3 hereinbelow. The first monitoring apparatus 3a and the second monitoring apparatus 3b may be directly connected by a signal cable 9.

The equipment control unit 4 manages and controls various kinds of plant equipment 5 (for example, boiler, turbine, power generator, furnace, tank, reactor, heat exchanger, temperature sensor, etc.). The equipment control unit 4 notifies the monitoring apparatus 3 of information showing a state of the plant equipment 5 (for example, whether or not the boiler is operating, a rotational speed of the turbine, a temperature shown by the temperature sensor, etc.) (hereinbelow, referred to as "state information"). The equipment control unit 4 controls the operation, setting, and the like of the plant equipment 5 on the basis of an instruction from the monitoring apparatus 3 or a self judgment. The equipment control unit 4 is constructed by, for example, a PCM (Programmable Control Module) or the like.

The monitoring apparatus 3 receives the state information which is notified from the plurality of equipment control units 4, collects them, and forms plant information (for example, operating situation of the whole plant, setting and operating situation of each equipment of the plant, etc.). The monitoring apparatus 3 transmits the plant information to the maintenance tool 2. When a control command to certain plant equipment 5 is received from the maintenance tool 2, the monitoring apparatus 3 forms control information showing the contents of the control command and transmits to the equipment control unit 4. The two or more monitoring apparatuses 3 exist. One of the monitoring apparatuses 3 plays a role of a main apparatus (monitoring apparatus of the active system) and the other monitoring apparatus 3 plays a role of a sub apparatus (monitoring apparatus of the standby system). Although the embodiment will be described on the assumption that, ordinarily, the first monitoring apparatus 3a plays a role of the main apparatus and the second monitoring apparatus 3b plays a role of the sub apparatus, naturally, the first monitoring apparatus 3a may play a role of the sub apparatus and the second monitoring apparatus 3b may play a role of the main apparatus.

When the main monitoring apparatus 3a is normally operating, the maintenance tool 2 and the equipment control unit 4 use the main monitoring apparatus 3a. If an abnormality occurred in the main monitoring apparatus 3a, the sub monitoring apparatus 3b plays a role of the main monitoring apparatus 3a in place of it. That is, the maintenance tool 2 and the equipment control unit 4 use the sub monitoring apparatus 3b. Such a process will be described in detail hereinafter.

The maintenance tool 2 obtains the plant information from the monitoring apparatuses 3a and 3b through the first communication network 7. The maintenance tool 2 presents the plant information to the administrator of the plant. By operating the maintenance tool 2, the administrator can notify the monitoring apparatuses 3a and 3b of the control command for the plant equipment 5. The maintenance tool 2 is constructed by, for example, a computer apparatus having an input interface, a display, and the like.

Each of the first communication network 7 and the second communication network 8 is a communication network which can bidirectionally communicate data. The first communication network 7 and the second communication network 8 may be wired networks or radio networks. Although the first communication network 7 and the second communication network 8 are the different communication networks in the embodiment, they may be a single communication network.

Figure 2:
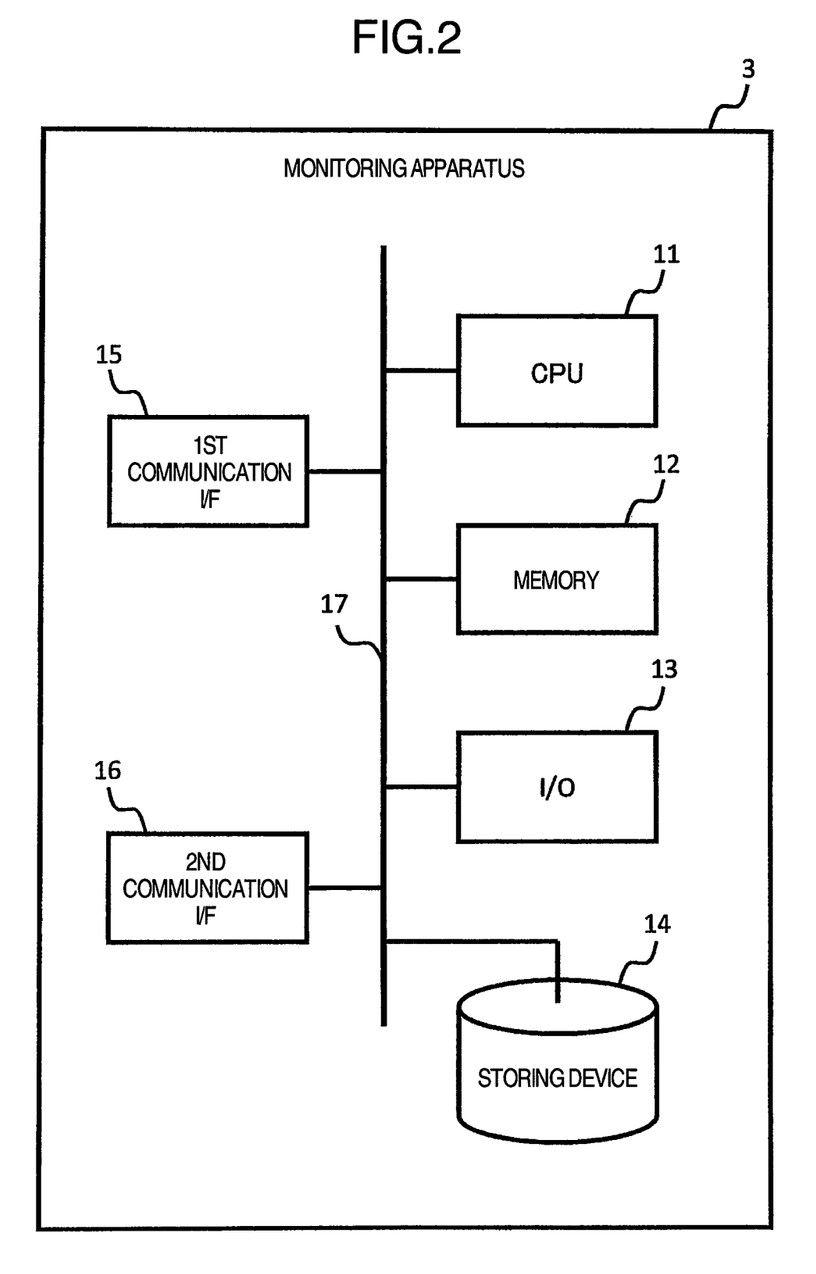
FIG. 2 is a block diagram showing a physical construction of a monitoring apparatus 3.

FIG. 2 is a block diagram showing a physical construction of the monitoring apparatus 3. The monitoring apparatus 3 has, for example, a CPU (Central Processing Unit) 11, a memory 12, a storing device 14, an I/O (Input/Output) 13, a first communication interface (hereinbelow, referred to as "I/F") 15, and a second communication I/F 16. Those component elements 11 to 16 are connected by a bus 17 which can bidirectionally communicate data.

The CPU 11 executes processes included in a computer program (hereinbelow, referred to as "program") and realizes various kinds of functions, which will be described hereinafter. The CPU 11 may read out the program from the storing device 14 and execute it or may obtain the program from an outside through the first communication network 7 or the second communication network 8 and execute it.

The memory 12 temporarily holds data which is necessary when the program is executed by the CPU 11. The memory 12 is constructed by, for example, a DRAM (Dynamic Random Access Memory) or the like.

The storing device 14 holds the program and data and the like which are permanently necessary when the program is executed. The storing device 14 is constructed by, for example, an HDD (Hard Disk Drive), a flash memory, or the like.

The I/O 13 is an interface which enables the monitoring apparatus to be connected to other apparatuses. For example, an input/output interface, an external storing device, or the like is connected to the I/O 13.

The first communication I/F 15 is connected to the first communication network 7 and controls communication with the maintenance tool 2. The second communication I/F 16 is connected to the second communication network 8 and controls communication with the plurality of equipment control units 4. Each of the first communication I/F 15 and the second communication I/F 16 is constructed by, for example, an MC (Network Interface Card) or the like.

Figure 3:
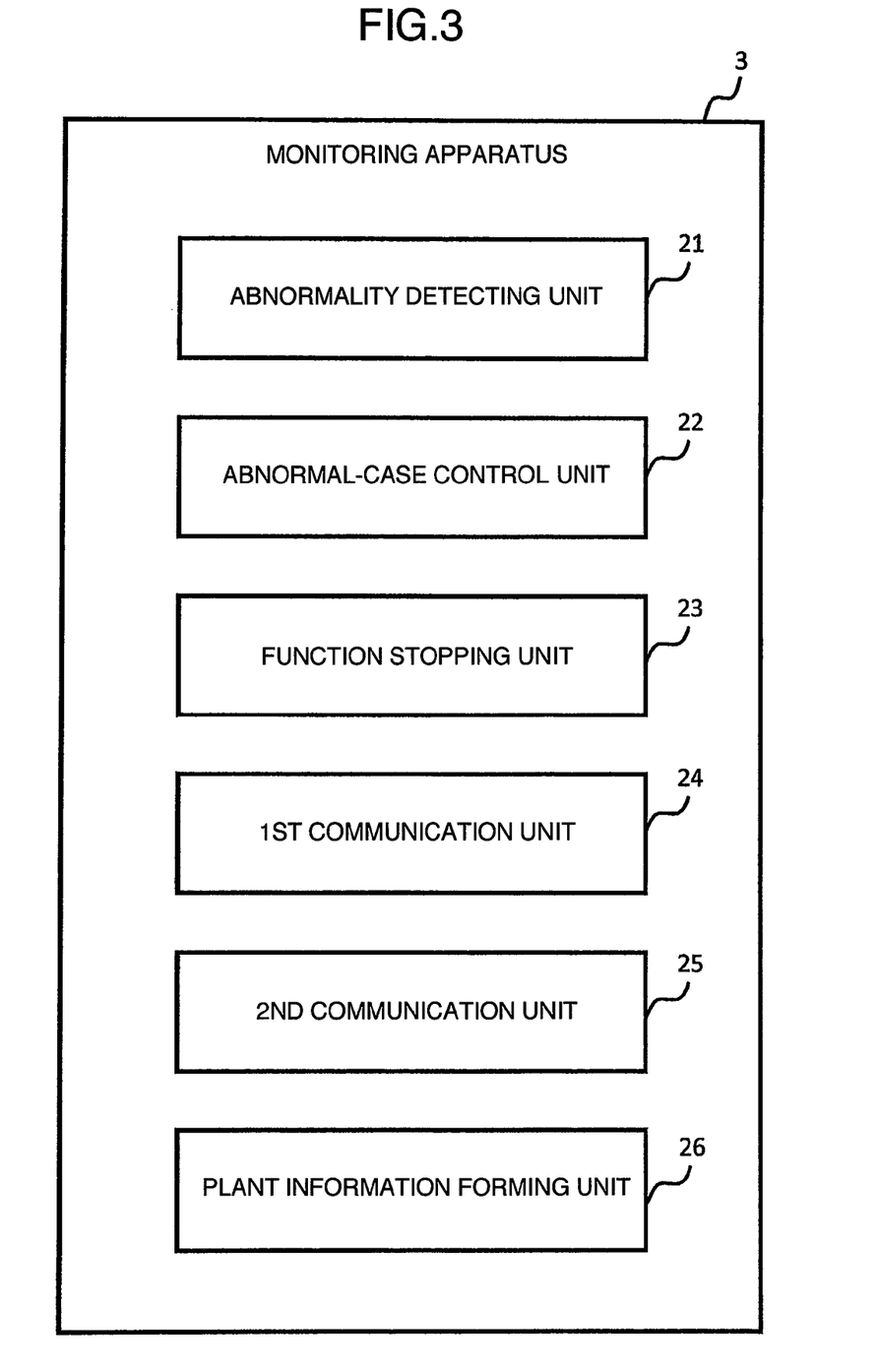
FIG. 3 is a block diagram showing a functional construction of the monitoring apparatus 3.

FIG. 3 is a block diagram showing a functional construction of the monitoring apparatus 3. The monitoring apparatus 3 has, for example, an abnormality detecting unit 21, an abnormal-case control unit 22, a function stopping unit 23, a first communication unit 24, and a second communication unit 25.

The abnormality detecting unit 21 detects an abnormality of the self apparatus 3a. "self apparatus" is a monitoring apparatus provided with the abnormality detecting unit 21. That is, for the monitoring apparatus 3a, the monitoring apparatus 3a itself is the self apparatus and the monitoring apparatus 3b is the other monitoring apparatus. The abnormality detecting unit 21 detects, for example, an abnormality of hardware such as I/O 13, storing device 14, first communication I/F 15, second communication I/F 16, or the like provided for the self apparatus 3a. The abnormality detecting unit 21 detects, for example, an abnormality of a certain task which is being executed by the self apparatus 3a. When the abnormality is detected, the abnormality detecting unit 21 notifies the abnormal-case control unit 22 of such a fact. At this time, the abnormality detecting unit 21 may notify the unit 22 of a degree of the detected abnormality together with it.

When an abnormality notification is received from the abnormality detecting unit 21, the abnormal-case control unit 22 transmits a main switching request to the sub monitoring apparatus 3b. The main switching request is information for requesting the sub monitoring apparatus 3b to executes the process in place of the main monitoring apparatus 3a. At this time, the abnormal-case control unit 22 transmits the main switching request to the sub monitoring apparatus 3b by using both of the first communication unit 24 and the second communication unit 25. That is, the abnormal-case control unit 22 transmits the main switching request to the sub monitoring apparatus 3b through both of the first communication network 7 and the second communication network 8. Thus, even if a trouble occurred in either the first communication I/F 15 (or the first communication network 7) or the second communication I/F 16 (or the second communication network 8), the main switching request can be transmitted to the sub monitoring apparatus 3b. When the monitoring apparatuses 3a and 3b are connected by the signal cable 9, the main switching request may be transmitted to the signal cable 9 in addition to the first communication network 7 and the second communication network 8. Or, after the abnormal-case control unit 22 transmitted the main switching request to the signal cable, if it fails in the transmission, the main switching request may be transmitted to the first communication network 7 and the second communication network 8. Consequently, the reliability and the trouble resistance of the plant monitoring and control system can be further raised.

When a response showing that the main switching process has successfully been executed is received from the sub monitoring apparatus 3b, the abnormal-case control unit 22 of the main monitoring apparatus 3a stops the self apparatus 3a. This is because even when the abnormality is small, if the sub monitoring apparatus 3b which is normally operating as a whole plays a role of the main monitoring apparatus rather than that the monitoring apparatus 3a in which the abnormality occurred successively plays a role of the main monitoring apparatus, the reliability of the whole system is further improved.

When a response showing that the main switching process has failed is received from the sub monitoring apparatus 3b or if no response is received, the abnormal-case control unit 22 of the monitoring apparatus 3a advances to the abnormal-case control mode.

In the abnormal-case control mode, the abnormal-case control unit 22 executes the following processes. The abnormal-case control unit 22 instructs the function stopping unit 23 so as to stop a device (for example, I/O device, external storing device, communication device, or the like), a task, or the like in which the abnormality occurred. This is because it is intended to construct in such a manner that the device, task, or the like in which the abnormality occurred does not exert any influence on a device, task, or the like which is normally operating. The abnormal-case control unit 22 instructs the first communication unit 24 and the second communication unit 25 so as to transfer the state information obtained from the equipment control unit 4 to the maintenance tool 2 as it is. This is because since there is a fear that the monitoring apparatus 3 in which the abnormality occurred cannot form the correct plant information, if the original state information is transferred to the maintenance tool 2 as it is, the reliability of the whole system is further improved.

The function stopping unit 23 can stop the device, task, or the like in which the abnormality occurred. The function stopping unit 23 is, for example, a part of the functions of an OS (Operating System) provided for the monitoring apparatus 3 and can compulsorily stop the device, task, or the like which is managed by the OS.

The first communication unit 24 controls the first communication I/F 15 and processes the communication with the maintenance tool 2. For example, the first communication unit 24 transfers various kinds of requests received from the maintenance tool 2 to the respective functional blocks or transmits the plant information to the maintenance tool 2. In the case of the abnormal-case control mode, the first communication unit 24 controls the first communication I/F 15 and transfers the state information transferred from the second communication I/F 16 to the maintenance tool 2 as it is. Such processes will be described in detail hereinafter.

The second communication unit 25 controls the second communication I/F 16 and processes the communication with the equipment control unit 4. For example, the second communication unit 25 transfers the state information received from the plant equipment 5 to the respective functional blocks or transmits a control command (for example, control command of the rotational speed of the turbine, etc.) for the plant equipment 5 to the equipment control unit 4. In the abnormal-case control mode, the second communication unit 25 controls the second communication I/F 16 and transfers the state information received from the equipment control unit 4 to the first communication I/F 15 as it is. Such processes will be described in detail hereinafter.

A plant information forming unit 26 forms the plant information by collecting the plurality of state information received from the equipment control unit 4. "collecting the plurality of state information" denotes such a process that, for example, the plant information regarding the whole plant equipment 5 is formed from the state information of the respective plant equipment 5 or the state information of different formats is converted into the plant information of a format which can be interpreted by the maintenance tool 2.

Figure 4:
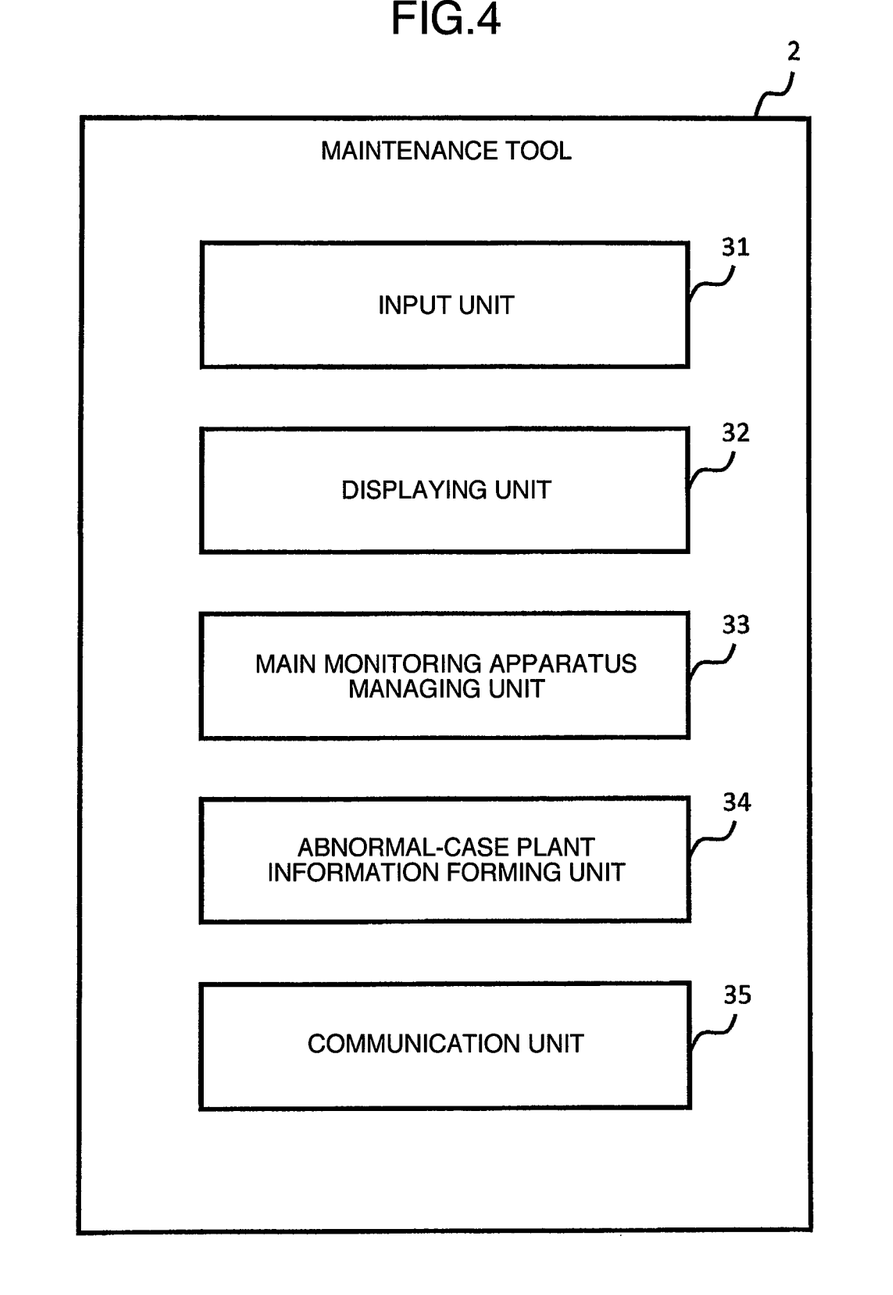
FIG. 4 is a block diagram showing a functional construction of a maintenance tool 2.

FIG. 4 is a block diagram showing a functional construction of the maintenance tool 2. The maintenance tool 2 has a physical construction (CPU, memory, storing device, communication I/F, etc.) of a general computer apparatus. Therefore, a description of the physical construction of the maintenance tool 2 is omitted.

The maintenance tool 2 has, for example, an input unit 31, a displaying unit 32, a main monitoring apparatus managing unit 33, an abnormal-case plant information forming unit 34, and a communication unit 35.

The input unit 31 controls an input I/F for receiving an input from the administrator of the plant. The input I/F is constructed by, for example, a keyboard switch, a mouse, a pen tablet, an audio recognizing apparatus, or the like.

The displaying unit 32 controls an output I/F for presenting various kinds of information formed by the maintenance tool 2 to the administrator. The output I/F is constructed by, for example, a displaying apparatus, a speaker, or the like.

The main monitoring apparatus managing unit 33 manages whether or not one of the plurality of monitoring apparatuses 3a and 3b is the main monitoring apparatus 3. The main monitoring apparatus managing unit 33 manages whether or not the main monitoring apparatus 3a is in the abnormal-case control mode. If the main monitoring apparatus 3a is in the abnormal-case control mode, the main monitoring apparatus managing unit 33 instructs the abnormal-case plant information forming unit 34 so as to form the plant information from the state information which is directly transmitted from the monitoring apparatus 3a.

When the main monitoring apparatus 3a is in the abnormal-case control mode, in place of the main monitoring apparatus 3a, the abnormal-case plant information forming unit 34 receives the state information and forms the plant information. The abnormal-case plant information forming unit 34 allows the plant information to be displayed onto the displaying unit 32. If a processing ability of the maintenance tool 2 is lower than that of the monitoring apparatus 3a, the abnormal-case plant information forming unit 34 may form the plant information which is simpler (in other words, an advanced process is not executed) than the plant information formed by the monitoring apparatus 3a. For example, a statistic process of data or the like can be simplified or data can be properly thinned out.

The communication unit 35 controls the communication I/F (not shown) provided for the maintenance tool 2 and communicates with the monitoring apparatuses 3a and 3b through the first communication network 7. For example, the communication unit 35 receives the plant information from the monitoring apparatus 3a or transmits a control instruction of the plant equipment 5 to the monitoring apparatus 3a.

Figure 5:
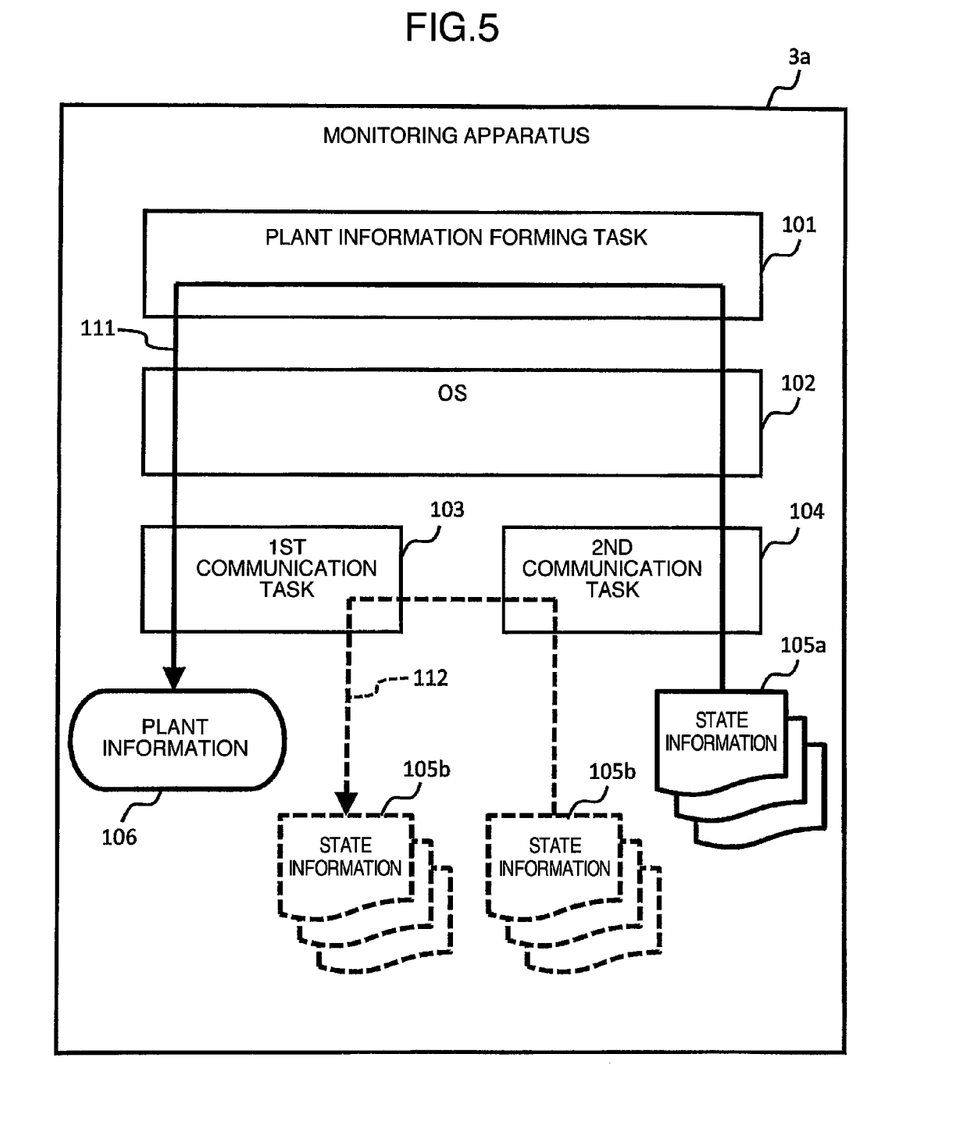
FIG. 5 is a diagram for describing a process of a monitoring apparatus 3a in an abnormal-case control mode.

FIG. 5 is a diagram for describing the process of the monitoring apparatus 3a in the abnormal-case control mode. The tasks which are executed by the monitoring apparatus 3a are constructed by layers of, for example, a first communication task 103, a second communication task 104, an OS (Operating System) 102, and an application task in order from the bottom. Generally, the task of the upper layer can use the task of the lower layer. "task" denotes a program which is being executed in the monitoring apparatus 3a.

The first communication task 103 (first communication unit 24) and the second communication task 104 (second communication unit 25) control the first communication I/F 15 and the second communication I/F 16, respectively.

The OS 102 manages and controls each task which is executed by the monitoring apparatus 3a. For example, the OS 102 activates a certain task or stops a certain task which is activating. The OS 102 intervenes between the application task and the first communication task 103 and the second communication task 104, thereby enabling the application task to transmit and receive the data through the communication network.

As an application task, for example, there are a plant information forming task 101 (plant information forming unit 26), a plant equipment control task, and the like.

First, the operation of each task in the case where the monitoring apparatus 3a is normal will be described (refer to an arrow 111). When the second communication task 104 receives state information 105a from each equipment control unit 4, the OS 102 detects it and notifies the plant information forming task 101 of such a fact. The plant information forming task 101 forms plant information 106 by collecting a plurality of obtained state information 105a. The plant information forming task 101 instructs the OS 102 so as to transmit the plant information 106 to the maintenance tool 2. The OS 102 instructs the first communication task 103 which can communicate with the maintenance tool 2 so as to transmit the plant information 106 to the maintenance tool 2.

Subsequently, the operation of each task in the case where the monitoring apparatus 3a is in the abnormal-case control mode will be described (refer to an arrow 112). In the case of the abnormal-case control mode, when state information 105b is received from each equipment control unit 4, the second communication task 104 transfers the state information 105b to the first communication task 103 without passing through the OS 102. The first communication task 103 transfers the state information 105b transferred from the second communication task 104 to the maintenance tool 2 as it is. That is, the monitoring apparatus 3a transfers the state information 105b received from the equipment control unit 4 to the maintenance tool 2 as it is without passing through the OS 102 and the plant information forming task 101. Thus, for example, even if an abnormality occurred in the plant information forming task 101, the OS 102, or the like, the monitoring apparatus 3a can notify the maintenance tool 2 of the state of the equipment control unit 4.

Figure 6:
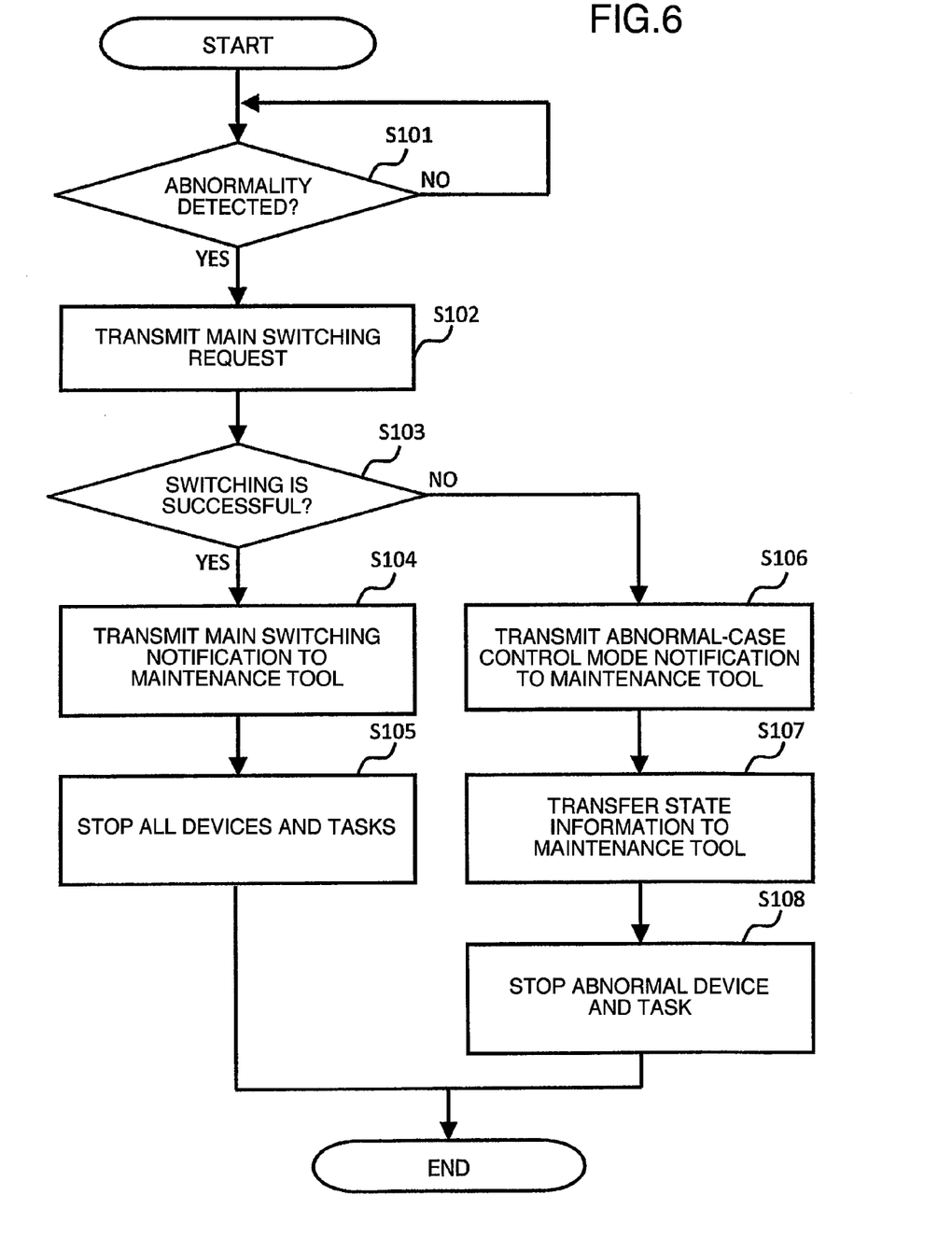

FIG. 6 is a flowchart showing the process of the main monitoring apparatus 3a. When the abnormality detecting unit 21 does not detect an abnormality (S101: NO), the process of step S101 is continued.

When the abnormality detecting unit 21 detects the abnormality (S101: YES), both of the first communication unit 24 and the second communication unit 25 are instructed so as to transmit a main switching request to the sub monitoring apparatus 3b (S102).

The abnormal-case control unit 22 waits for a response from the sub monitoring apparatus 3b and discriminates whether or not the sub monitoring apparatus 3b has normally been switched to the role of the main monitoring apparatus (S103).

If a response showing that the switching to the main monitoring apparatus is successful is received from the sub monitoring apparatus 3b (S103: YES), the abnormal-case control unit 22 transmits a main switching notification showing that the main monitoring apparatus has been switched from the monitoring apparatus 3a to the monitoring apparatus 3b to the maintenance tool 2 (S104). The abnormal-case control unit 22 instructs the function stopping unit 23 so as to stop all of the devices, tasks, and the like of the self apparatus 3a (S105) and the present processing routine is finished (END).

If a response showing that the switching to the main monitoring apparatus has failed is received from the sub monitoring apparatus 3b or if no response is returned for a predetermined time (S103: NO), the abnormal-case control unit 22 transmits an abnormal-case control mode notification showing that the self apparatus 3a is in the abnormal-case control mode to the maintenance tool 2 (S106). The abnormal-case control unit 22 instructs the first communication unit 24 and the second communication unit 25 so as to transfer the state information received from each plant equipment 5 to the maintenance tool 2 as it is (S107). The abnormal-case control unit 22 instructs the function stopping unit 23 so as to stop the devices, tasks, and the like in which the abnormality occurred (S108) and the present processing routine is finished (END).

Figure 7:
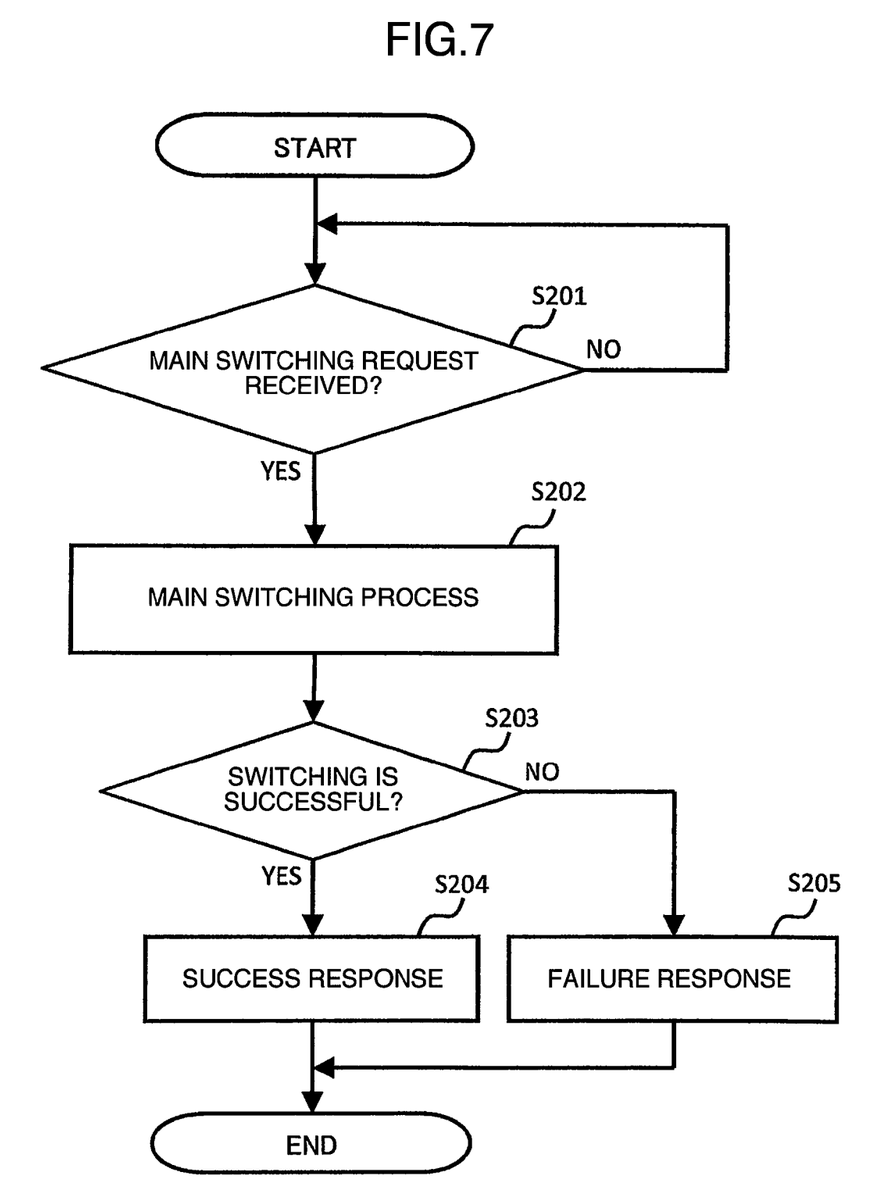
FIG. 7 is a is a flowchart showing a process of a sub monitoring apparatus 3b.

FIG. 7 is a is a flowchart showing the process of the sub monitoring apparatus 3b. If the first communication unit 24 or the second communication unit 25 does not receive the main switching request (S201: NO), the first communication unit 24 and the second communication unit 25 continue the process of step S201.

If the first communication unit 24 or the second communication unit 25 received the main switching request (S201: YES), the abnormal-case control unit 22 executes the process for switching the self sub monitoring apparatus 3b to the role of the main apparatus (S202).

If the self sub monitoring apparatus 3b has successfully been switched to the role of the main apparatus (S203: YES), the abnormal-case control unit 22 returns a response showing that the switching to the main is successful to the original main monitoring apparatus 3a (S204) and the present processing routine is finished (END).

If the switching of the self apparatus 3b to the role of the main has failed (S203: NO), the abnormal-case control unit 22 returns a response showing that the switching to the main has failed to the original main monitoring apparatus 3a (S205) and the present processing routine is finished (END).

Figure 8:
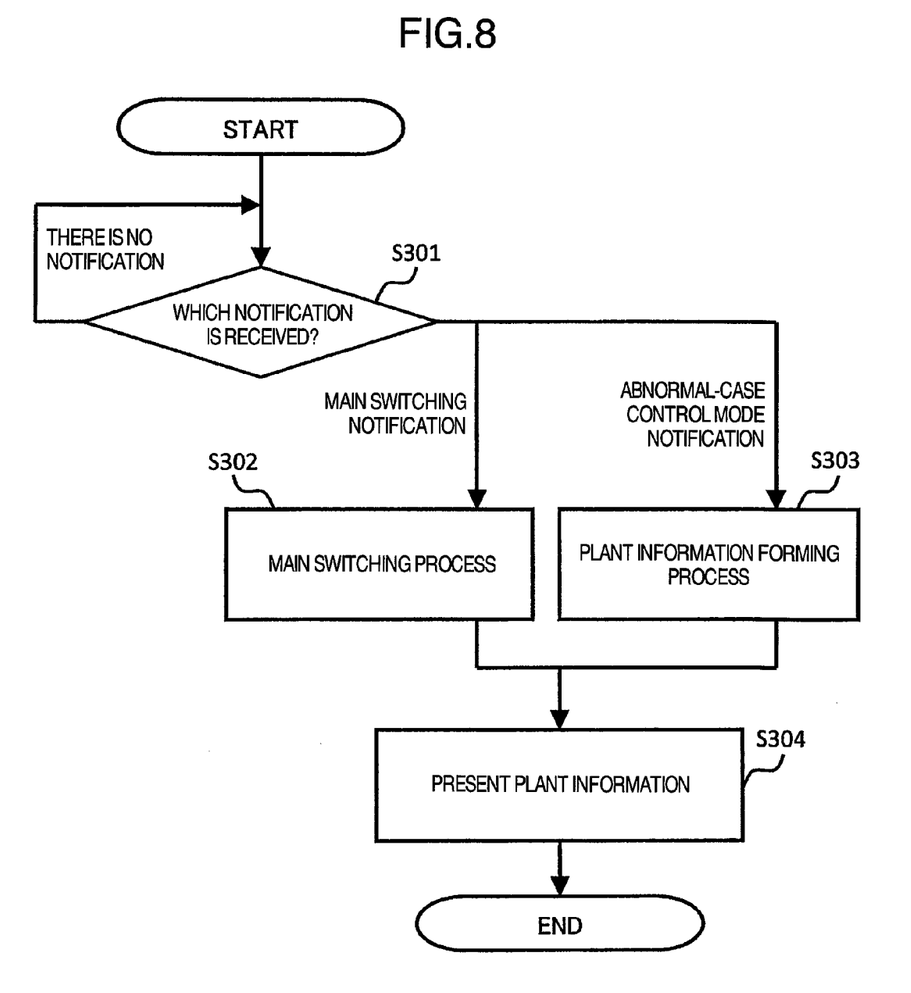
FIG. 8 is a flowchart showing a process of the maintenance tool 2.

FIG. 8 is a flowchart showing the process of the maintenance tool 2. The main monitoring apparatus managing unit 33 discriminates whether or not the "main switching notification" or the "abnormal-case control mode notification" has been received from the main monitoring apparatus 3a (S301).

If both of the notifications are not received (S301: there is no notification), the main monitoring apparatus managing unit 33 continue the process of step S301.

If the "main switching notification" has been received (S301: main switching notification), the main monitoring apparatus managing unit 33 switches the main monitoring apparatus from 3a to 3b (S302) and advances to a process of step S304.

If the "abnormal-case control mode notification" has been received (S301: abnormal-case control mode notification), the main monitoring apparatus managing unit 33 instructs the abnormal-case plant information forming unit 34 so as to form plant information on the basis of the state information which is transferred from the monitoring apparatus 3a (S303) and advances to the process of step S304.

The displaying unit 32 presents the plant information received from the main monitoring apparatus 3a or the plant information formed by the abnormal-case plant information forming unit 34 to the administrator of the plant (S304) and the present processing routine is finished (END).

According to the embodiment, when the sub monitoring apparatus 3b is normal, even if the trouble which occurred in the self apparatus 3a is small, the main monitoring apparatus 3a stops immediately. The sub monitoring apparatus 3b plays a role of the main apparatus. Thus, if a significant trouble occurred in the main monitoring apparatus 3a, it is possible to prevent that its influence is exerted on the whole system. Therefore, the reliability and the trouble resistance of the whole system can be raised.

When the sub monitoring apparatus 3b is not normal or when the sub monitoring apparatus 3b does not exist, even if the trouble which occurred in the self apparatus 3a is serious, the main monitoring apparatus 3a is not stopped as much as possible but shifts to the abnormal-case control mode. In the abnormal-case control mode, the main monitoring apparatus 3a transfers the state information received from the plant equipment to the maintenance tool 2 as it is. Thus, even if the abnormality occurred in both of the main monitoring apparatus 3a and the sub monitoring apparatus 3b, the administrator can confirm the state of the least limit plant equipment.

The foregoing embodiment of the invention is an example for description of the invention and the scope of the invention is not limited only to such an embodiment. A person skilled in the art can embody the invention by other various forms without departing from the essence of the invention.

For example, if the abnormality occurred in the main monitoring apparatus and the sub monitoring apparatus exists, the main monitoring apparatus may execute the following operation. The main monitoring apparatus is not perfectly stopped as mentioned above but makes only the first communication unit and the second communication unit operative, thereby enabling the state information to be transferred to the maintenance tool. Thus, both of the main and sub monitoring apparatuses can transfer the state information to the maintenance tool, respectively, and the reliability and the trouble resistance of the whole system can be further improved.

The invention can be also mentioned as follows.

"A plant monitoring and control system comprising: a plurality of control units for monitoring and controlling states of a plurality of plant equipment through a second communication network; and a maintenance tool for maintaining the plurality of control units through a first communication network, wherein the plurality of control units are connected by a signal cable for transmitting a predetermined signal, the maintenance tool monitors and controls the states of the plurality of plant equipment through a main control unit serving as one of the plurality of control units, and the main control unit is constructed in such a manner that when an abnormality is detected in a self apparatus, a substituting request for requesting a substitution of a process of the self apparatus is transmitted to a sub control unit serving as a control unit other than the main control units through the signal cable and the main control unit is disconnected from the plant monitoring and control system, and when the abnormality of the self apparatus is recovered, the main control unit participates in the plant monitoring and control system as a sub control unit, and one of a plurality of sub control units which received the substituting request becomes the main control unit."

It should be further understood by those skilled in the art that although the foregoing description has been made on embodiments of the invention, the invention is not limited thereto and various changes and modifications may be made without departing from the spirit of the invention and the scope of the appended claims.

The invention claimed is:

1. A plant monitoring and control system comprising a plurality of control units for monitoring and controlling states of a plurality of plant equipment through a second communication network and a maintenance tool for maintaining the plurality of control units through a first communication network, wherein each of the plurality of control units has:

an abnormality detecting unit for detecting an abnormality of the control unit itself;

a second communication unit for receiving state information as information regarding the states of the plurality of plant equipment from the plurality of plant equipment through the second communication network;

a plant information forming unit for forming plant information as information regarding the whole plant equipment on the basis of the plurality of state information;

a first communication unit for transmitting the plant information to the maintenance tool through the first communication network; and an abnormal-case control unit constructed in such a manner that when the abnormality detecting unit detects an abnormality, a substituting request for requesting a substitution of a process of the control unit having the abnormality is transmitted to another control unit among the plurality of control units, (a) when a response to the substituting request is affirmative, an operation of the control unit itself is stopped, (b) when the response to the substituting request is negative or when the response to the substituting request is not received, the first communication unit and the second communication unit are controlled, and the state information received by the second communication unit is transferred to the maintenance tool, and wherein in the case of (a), the abnormal-case control unit stops all tasks which are operating in the control unit itself, and in the case of the (b), the abnormal-case control unit stops only a task in which the abnormality occurred in the control unit.

2. The system according to claim 1, wherein when the substituting request is transmitted to the other control unit, the abnormal-case control unit instructs both of the first communication unit and the second communication unit so as to transmit the substituting request to the another control unit.

3. The system according to claim 1, wherein the control units are connected by a signal cable for transmitting a predetermined signal, and when the substituting request is transmitted to the other control unit, the abnormal-case control unit transmits the substituting request through the signal cable, and when the transmission has failed, the abnormal-case control unit instructs both of the first communication unit and the second communication unit so as to transmit the substituting request to the other control unit.

4. The system according to claim 1, wherein in the case where the control unit corresponds to the (b), the maintenance tool receives the plurality of state information which is transferred from the control units and forms the plant information by itself on the basis of the plurality of state information.

5. A plant monitoring and control method of a plant monitoring and control system comprising a plurality of plant equipment, a plurality of control units for monitoring and controlling states of the plant equipment through a second communication network, and a maintenance tool for maintaining the plurality of control units through a first communication network, wherein the control unit is constructed in such a manner that:

when a control unit of the plurality of control unit is normal, state information as information regarding the states of the plurality of plant equipment is received through the second communication network, plant information as information regarding the whole plant equipment is formed on the basis of the plurality of state information, and the plant information is transmitted to the maintenance tool through the first communication network; and when an abnormality is detected in a control unit, a substituting request for requesting a substitution of a process of the control unit is transmitted to another control unit among the plurality of control units, (a) when a response to the substituting request is affirmative, an operation of the control unit itself is stopped, (b) when the response to the substituting request is negative or when the response to the substituting request is not received, the state information received through the second communication network is transferred to the maintenance tool, and wherein in the case of (a), the abnormal-case control unit stops all tasks which are operating in the control unit itself, and in the case of the (b), the abnormal-case control unit stops only a task in which the abnormality occurred in the control unit.

* * * * *